May 3, 1938.  C. L. BLACKBURN  2,115,899
GAUGE GLASS INDICATOR
Filed Jan. 7, 1935
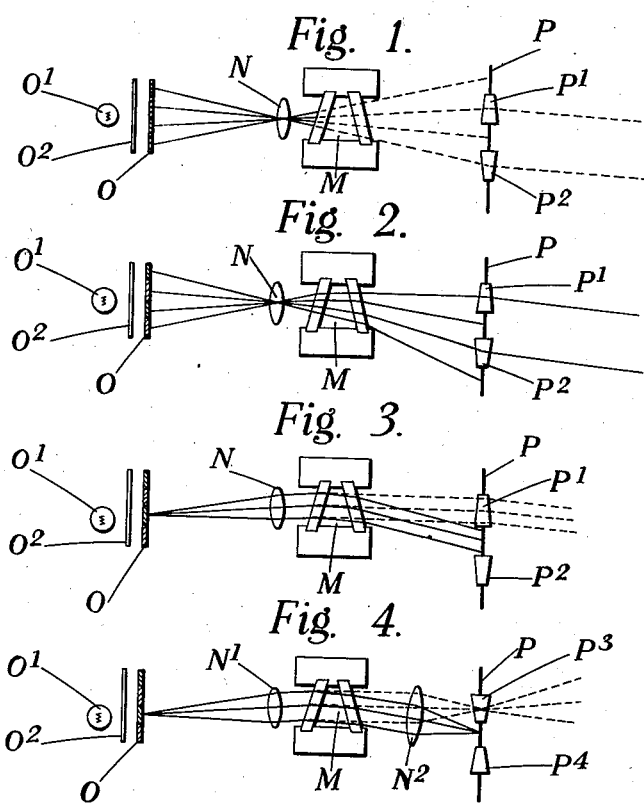
INVENTOR
Charles Lord Blackburn
BY
Charles B. Belknap
ATTORNEY Patented May 3, 1938

2,115,899

UNITED STATES PATENT OFFICE 2,115,899

GAUGE GLASS INDICATOR

Charles Lord Blackburn, London, England, assignor, by mesne assignments, to Diamond Power Specialty Corporation, Detroit, Mich., a corporation of Michigan Application January 7, 1935, Serial No. 777
In Great Britain January 9, 1934

4 Claims. (Cl. 73—293)

This invention relates to a liquid level indicating arrangement of the kind employing a transparent liquid level gauge illuminated from a suitable source or sources, and, although not limited thereto, is more especially applicable to the indication of the water level in a boiler having a high combustion chamber wherein the gauge is necessarily at a considerable height above the firing floor. Difficulty is experienced with such an arrangement in rendering the indications of the gauge readily visible from the firing floor, and numerous proposals have been made to obviate this difficulty. Some of these proposals involve projection of an image of the gauge on to a remote diffusing screen, whilst in others the gauge itself or auxiliary devices adjacent to the gauge are so arranged as to increase the maximum distance at which the gauge indication is directly visible. With such proposals, in the case of projecting arrangements, the image of the gauge is thrown on to a flat diffusing screen and insufficient light is available to enable the indication to be properly determined at a widely oblique angle of vision, whilst, in the case of direct vision arrangements, the angle of vision is again usually very narrow and a further difficulty is often experienced in determining the indications of the gauge at any considerable distance owing to the glare effect of the light.

The present invention has for its object to provide an improved liquid level indicating arrangement in which such drawbacks are eliminated or considerably reduced.

According to one feature of the invention a refracting of reflecting device is located in part of the emergent beam from the gauge with or without further such devices in other parts of the emergent beam, and the device or devices are so arranged that at least some of the rays from a point in the gauge in one part of the emergent beam will be deflected into approximately the same direction as rays from the same point of the gauge or from a point in the same vertical line therein in another part of the beam. Thus rays which would otherwise diverge from one another may be brought together, for example to enable them to be viewed simultaneously from a chosen observing point or to enable a brighter image of the gauge to be obtained on a diffusing screen.

According to a further feature of the invention intended for direct vision, the gauge has a wedge-shaped central space for the liquid column or is otherwise so arranged that two horizontal rays of light incident on the gauge respectively above and below the liquid level will be deflected through different angles, and a narrow vertical strip of light is disposed in the focal plane of a lens or mirror, the light from which is directed on to the gauge, so that the emergent beam from the gauge is in two separate parts diverging at an angle to one another respectively above and below the liquid level, two colour screens of different colours being disposed respectively in the two parts of the emergent beam from the gauge. With this arrangement a refracting or reflecting device may be disposed in one or in each part of the emergent beam from the gauge to bring the two differently coloured parts of the beam parallel to one another so that they can be simultaneously viewed from a remote observing point.

Some convenient alternative practical arrangements according to the invention, as applied to the indication at a remote point (for example on the firing floor) of the water level in a boiler having a high combustion chamber, are illustrated diagrammatically in the accompanying drawing, in which Figures 1–3 are diagrammatic plan views of one arrangement in which a real image of the gauge is optically projected, and Figure 4 is a similar view showing an alternative projecting arrangement.

The arrangements shown by the figures while not necessarily so limited are intended primarily for direct vision and may be regarded as adaptations of arrangements described in the present applicant's United States Patent No. 2,024,815. In each of these arrangements the gauge M is of the type having a wedge-shaped central space for the water and steam column or is otherwise so arranged that two horizontal rays of light incident on the gauge respectively above and below the water level would be deflected through different angles by the gauge.

In the arrangement of Figures 1–3 the gauge M is illuminated by flash illumination of a vertical cylindrical lens N near the gauge by means of an illuminating device in the focal plane of the lens. The illuminating device comprises a series of vertical strips of light and is preferably in the form of a colour screen having alternating vertical strips O of two different colours uniformly illuminated by a lamp or series of lamps $O^1$ and a diffusing screen $O^2$. Other forms of illuminating device with alternating vertical strips may however be used.

With this arrangement rays emanating from a single vertical line in the illuminating device O above the water level will emerge from the gauge M parallel to one another in one direction as indicated by the dotted lines in Figures 1 and 3, whilst rays emanating from the same line in the illuminating device below the water level will emerge from the gauge parallel to one another in a different direction as indicated by the full lines in Figures 2 and 3, Figure 1 showing one ray from each colour strip passing centrally through the lens N above the water level, whilst Figure 2 shows similar rays below the water level and Figure 3 shows a group of rays emanating from a single vertical line in the illuminating device. With this arrangement alone the indications of the gauge M would appear to an observer moving across the front of the gauge (assuming the illuminating device O to consist of appropriately spaced alternate red and green strips), first with its upper part green and its lower part red, then with its upper part red and its lower part green, then again with its upper part green and its lower part red and so on. By arranging a suitably slotted mask P in the emergent beam from the gauge, the alternate indications can be cut off altogether. Thus each slot will appear within a narrow angle of vision with its upper part red and its lower part green. Outside the angle of vision for each slot, the slot will appear completely dark, but by mounting vertical prisms $P^1$—$P^2$ (or mirrors) within or adjacent to the slots the emergent beams can be swung round through any desired angle, and the angles of vision can be swung together just sufficiently to provide continuous vision of one or other of the slots over a wider angle. Thus for instance with two slots in the mask P, a total angle of vision can be obtained approximately twice the angle of vision for a single slot.

The arrangement of Figure 4 differs from that of Figures 1–3 in the use in place of the single lens N of an optical system which may conveniently consist of two vertical cylindrical lenses $N^1$ $N^2$ respectively in front of and behind the gauge M, the illuminating device O and the slotted mask P being disposed substantially in planes passing through conjugate foci of the optical system $N^1$ $N^2$. With this arrangement all rays emanating from a vertical line in the illuminating device O will be focussed in the plane of the mask P in the form of two vertical lines, respectively above and below the liquid level, spaced apart by a distance dependent on the different prismatic deflections of the water prism and the steam prism in the gauge. By suitably dimensioning the parts of the apparatus it can be arranged that the two spaced images of a vertical dividing line between two adjacent colour strips in the illuminating device O lie respectively at the two edges of a slot in the mask P, and the slot will thus appear to a distant observer within a definite angle of vision as of one colour, say red, above the water level and the other colour, say green, beneath it. This arrangement gives a wider angle of vision from each slot than the arrangement of Figures 1–3, and, in fact, with the arrangement illustrated the angles of vision for the various slots will overlap. Consequently to give a continuous angle of vision the beams from the various slots must be swung apart through a suitable angle, for instance by means of prisms $P^3$ $P^4$ in the slots. Although it is not essential to the arrangement, it is preferable to arrange the illuminating device O in the focal plane of the first cylindrical lens $N^1$ so as to give flash illumination of the lens, and the mask P in the focal plane of the second cylindrical lens $N^2$, so that the rays from a vertical line in the illuminating device O will lie in parallel planes in their passage through the gauge M.

If the gauge is to be observed from a point considerably below the height of the gauge, it is preferable (in order to avoid errors due to the obliquity of rays passing through the cylindrical lenses) to employ only the approximately horizontal rays passing through the gauge and to provide a reflecting or refracting device in each slot in the mask P to deflect the rays downwards at the desired angle.

It will be appreciated that the above arrangements have been described by way of example only and that the invention may be carried into practice in other ways.

What I claim as my invention and desire to secure by Letters Patent is:—

1. In a liquid level indicating arrangement, the combination of a transparent liquid level gauge so arranged that two horizontal rays of light incident on the gauge respectively above and below the liquid level will be deflected by the gauge through different angles, an illuminating device comprising a plurality of narrow vertical strips of light disposed side by side one set of alternate strips being visually distinguishable from the other set of alternate strips, an optical element in whose focal plane the illuminating device is located and from which the light from the illuminating device is directed on to the gauge so that the beam from any one vertical strip is divided by the gauge into two separate emergent beams diverging at an angle to one another respectively above and below the liquid level, a mask having spaced vertical slots in it for cutting off the lower emergent beams derived from one set of alternate strips and the upper emergent beams derived from the other set of alternate strips, and ray-deflecting devices associated with the slots in the mask for deflecting the remaining emergent beams from each slot at such respective angles that continuous vision of the slots is obtained.

2. In a liquid level indicating arrangement, the combination of a transparent liquid level gauge so arranged that two horizontal rays of light incident on the gauge respectively above and below the liquid level will be deflected by the gauge through different angles, an illuminating device comprising a plurality of narrow vertical strips of light disposed side by side and spaced apart, an optical element in whose focal plane the illuminating device is located and from which the light from the illuminating device is directed on to the gauge so that the beam from any one vertical strip is divided by the gauge into two separate emergent beams diverging at an angle to one another respectively above and below the liquid level, a mask having spaced vertical slots in it for cutting off either all the lower emergent beams or all the upper emergent beams, and ray-deflecting devices associated with the slots in the mask for deflecting the remaining emergent beams from each slot at such respective angles that continuous vision of the slots is obtained.

3. In a liquid level indicating arrangement, the combination of a transparent liquid level gauge so arranged that two horizontal rays of light incident on the gauge respectively above and below the liquid level will be deflected by the gauge through different angles, an illuminating device comprising a plurality of narrow vertical strips of light disposed side by side one set of alternate strips being visually distinguishable from the other set of alternate strips, a mask having spaced vertical slots in it, an optical system associated with the gauge with the illuminating device and the slotted mask disposed substantially in planes passing through conjugate foci of the optical system whereby the beam from any one vertical strip of light is divided by the gauge into two separate emergent beams diverging at an angle to one another respectively above and below the water level, the arrangement being such that the mask cuts off the lower emergent beams derived from one set of alternate strips and the upper emergent beams derived from the other set of alternate strips, and ray-deflecting devices associated with the slots in the mask for deflecting the remaining emergent beams from each slot at such respective angles that continuous vision of the slots is obtained.

4. In a liquid level indicating arrangement, the combination of a transparent liquid level gauge so arranged that two horizontal rays of light incident on the gauge respectively above and below the liquid level will be deflected by the gauge through different angles, an illuminating device comprising a plurality of narrow vertical strips of light disposed side by side and spaced apart, a mask having spaced vertical slots in it, an optical system associated with the gauge with the illuminating device and the slotted mask disposed substantially in planes passing through conjugate foci of the optical system whereby the beam from any one vertical strip is divided by the gauge into two separate emergent beams diverging at an angle to one another respectively above and below the water level, the arrangement being such that the mask cuts off either all the lower emergent beams or all the upper emergent beams, and ray-deflecting devices associated with the slots in the mask for deflecting the remaining emergent beams from each slot at such respective angles that continuous vision of the slots is obtained.

CHARLES LORD BLACKBURN.